(12) United States Patent
Haaramo et al.

(10) Patent No.: US 9,147,207 B2
(45) Date of Patent: Sep. 29, 2015

(54) SYSTEM AND METHOD FOR GENERATING IMAGE DATA FOR ON-LINE SHOPPING

(75) Inventors: Jutta Haaramo, Espoo (FI); Jayasimha Ramachandra Rao, Espoo (FI); Leonardo Da Silva, Jaboatao dos Guararapes (BR)

(73) Assignee: Stylewhile Oy, Helsinki (FI)

( * ) Notice: Subject to any disclaimer, the term of this patent is extended or adjusted under 35 U.S.C. 154(b) by 135 days.

(21) Appl. No.: 13/544,594

(22) Filed: Jul. 9, 2012

(65) Prior Publication Data

US 2014/0010449 A1    Jan. 9, 2014

(51) Int. Cl.
*G06Q 30/06* (2012.01)
*G06T 19/00* (2011.01)

(52) U.S. Cl.
CPC .............. *G06Q 30/06* (2013.01); *G06T 19/00* (2013.01); *G06T 2210/16* (2013.01)

(58) Field of Classification Search
None
See application file for complete search history.

(56) References Cited

U.S. PATENT DOCUMENTS

| | | | |
|---|---|---|---|
| 2001/0026272 A1* | 10/2001 | Feld et al. | 345/419 |
| 2009/0089186 A1* | 4/2009 | Paolini | 705/27 |
| 2009/0213117 A1* | 8/2009 | Weaver | 345/420 |
| 2011/0246329 A1* | 10/2011 | Geisner et al. | 705/27.1 |
| 2011/0274314 A1* | 11/2011 | Yang et al. | 382/103 |
| 2011/0293188 A1* | 12/2011 | Zhang et al. | 382/190 |
| 2011/0298897 A1* | 12/2011 | Sareen et al. | 348/47 |

OTHER PUBLICATIONS

Cushen et al. "Markerless Real-Time Garment Retexturing from Monocular 3D Reconstruction," 2011.*
Hauswiesner et al. "Image-Baed Clothes Transfer," 2011.*

* cited by examiner

*Primary Examiner* — Vu Le
*Assistant Examiner* — Alexander J Lesnick
(74) *Attorney, Agent, or Firm* — Ziegler IP Law Group LLC

(57) ABSTRACT

A method and system for generating image data representative of a person wearing one or more items of clothing includes using computing hardware to process data of one or more images of people wearing items of clothing to extract via segmentation processes data representative of the items of clothing; using computing hardware to process the data representative of the items of clothing to complete one or more missing parts of the data representative of the items of clothing to generate corresponding clothes data; using computing hardware to analyse an image of a target model to determine a pose of the target model in the image; and using computing hardware to metamorphose at least a portion of the clothes data to fit the image of the target model to generate metamorphosed clothes data, and to overlay the metamorphosed clothes data onto the image of the target model.

20 Claims, 4 Drawing Sheets

SYSTEM AND METHOD FOR GENERATING IMAGE DATA FOR ON-LINE SHOPPING

BACKGROUND

1. Field

The aspects of the disclosed embodiments relate generally to generating image data for on-line shopping for users More specifically, the disclosed embodiments relate to a system, method and software product for generating image data for on-line shopping of one or more clothing items, wherein the system provides an environment in which a given user of the system is able to fit the one or more clothing items to a virtual representation of the given user or to a default model. Furthermore, the present invention relates to software products recorded on machine-readable data storage media, wherein the software products are executable upon computing hardware for implementing aforementioned methods.

2. Brief Description of Related Developments

On-line shopping web-sites, for example supported in a contemporary Internet environment, are well known. Indeed, on-line shopping is one of the most popular ways in which the Internet is presently utilized. For example, shopping for clothing on-line via the Internet is growing in popularity because it potentially offers users a broader range of choice of clothing in comparison to earlier off-line clothes boutiques and superstores.

There are on-line shopping web-sites, namely "shops", whereat users can "fit clothes" before making a purchase of the clothes. For example, a web-site Fits.me requests that a given user of the web-site inputs his/her body measurements. The web-site provides a service which makes a cyberspace model of the given user based upon the inputted measurements. Thereafter, the given user can try store clothes on the model to determine whether or not there is a satisfactory fit of the clothes to the model. A problem resulting from the use of this web-site is that it requires the given user to input numerous measurement parameters which is rather laborious Alternatively, a known web-site Lazylazy.com provides a service wherein a given user can observe how one or more selected items of clothing appear when applied to a fixed model. Moreover, a web-site Stuku.com provides a service wherein a body scan of a given user is performed using a software tool Kinetics; however, such body scanning requires additional tools and is found by users to be unwieldy.

In a published United States patent application no. US2011/10273592A1 ("Image Processing Device, Image Processing Method and Program", Sony Corp.), there is described an image processing device including a clothing extractor for extracting a face or a head from an input image, wherein the face or head portion is a region estimated to be a face or head image, and extracting a clothing region from a region immediately below the face or head portion. The clothing region is a region estimated to be a clothing image, and a clothing converter changes clothing in the input image by performing predetermined image processing on an image in the clothing region in the input image.

In a published United States patent application no. US2010/0111370A1 ("Method and apparatus for estimating body shape", Brown University), there is described a system and method of estimating a body shape of an individual from input data such as images or range maps. The body may appear in one or more poses captured at different times and a consistent body shape is computed for all poses. The body may appear in minimal tight-fitting clothing or in normal clothing wherein the method produces an estimate of the body shape under the clothing. Clothed or bare regions of the body are detected via image classification and the fitting method is adapted to treat each region differently. Body shapes are represented parametrically and are matched to other bodies based on shape similarity or other features. Standard measurements are extracted using parametric or non-parametric functions of body shape. Components of the system support many applications in body scanning, advertising, social networking, collaborative filtering and Internet clothing shopping.

In a granted United States patent no. U.S. Pat. No. 7,308,332B2 ("Virtual Clothing Modelling", Kabushiki Kaisha), there is described a method of trying on clothes by way of a simulation process, wherein an image sequence is processed by employing a posture dictionary, and a three-dimensional figure, obtained in advance, of a person who wishes to try on clothing. The process includes estimating the posture of the person, and simulating the motions of the clothes, in agreement with estimated time series posture data. There is utilized a virtual modeling apparatus comprising an imaging device configured to take an image sequence, a posture-estimator which estimates a posture of a person in the image sequence from three-dimensional figure data of the person and from data for various postures, a posture corrector which generates smooth and natural posture time series data from the timer series of estimated postures, a clothes simulator which calculates the motions of the clothing being modeled, and a display device which displays images of the person as if they were actually wearing the clothing.

In a published United States patent no. U.S. Pat. No. 5,680,528 ("Digital Dressing Room", Korszun), there is described a system and software programs and a database of digital images, including garment images and a basic model body image, which allows a client to select and "try on", individual or by mixing and matching, the different garment images of the database. The system renders an image of the client's body in the garments, with the client's specific curves, bulges and height which reflect the client's body measurements. In overview, the system comprises two parts: a pre-process and an online process. The pre-process prepares the images for inclusion in the database and addresses at least the following issues:

(a) photographing and digitizing the images;
(b) deriving stencils of the images;
(c) correcting image misalignments;
(d) centring the basic model body;
(e) detaching the arms/sleeves of the images; and
(f) classifying garments.

The online process, which employs image processing techniques including geometric transformations, for example digital warping, translations, rotations, edge detection, and so forth, takes as user inputs the client's measurements, for example bust, waist, hips and height, and the selected garments. Thereafter, the online process layers the garments, thereby creating an ensemble, and then transforms the basic model body to reflect the client's height, translates the ensemble unto the body reflecting the client's height, analyzes the amount of garment ease in the ensemble, reshapes the torso of the clad body to show the client's girth, calculates the trigonometric functions used to re-attach untransformed arms/sleeves, and then attaches arms/sleeves onto the reshaped torso. The result is a rendering of a clothing ensemble as it would drape a body with the client's measurements.

In a published United States patent application no. US2011/0298897A1 ("System and Method for 3D Virtual Try-on of Apparel on an Avatar", Sareen), there is described a method of, and apparatus for, providing for 3-dimensional (3D) virtual try-on apparel on an avatar. The method of fitting a garment on a person's body on-line comprises receiving specifications of a garment, receiving body specifications of one or more fit models, receiving one or more grade rules, receiving one or more fabric specifications, and receiving specifications of a consumer's body. The value of one or more fabric constants is determined according to the received one or more fabric specifications. One or more virtual garments in graded sizes are created and stored in a database based on the received garment specifications and fabric constants. Moreover, one or more graded virtual fit models are created and stored in a database based on the received specifications of the fit model. Each virtual garment is optionally draped on the related virtual fit model to create a fit-model drape. An avatar is received or created to represent a consumer's body shape. One of the virtual garments is optionally selected, draped, and displayed to the consumer.

In a published United States patent application no. US2011/0234581A1 ("Methods and Systems for 3D rendering of a Virtual Augmented Replica of a Product Image merged with a Model Image of a Human-body Feature", AR (ES) Technologies Ltd.), there is described a system for rendering a merged 3D augmented replica of a 3D product image and a 3D model image of a body part. A 3D modeling engine transforms an acquired 2D image of a body part into a 3D augmented replica thereof. A graphical user interface (GUI) enables the merging, displaying and manipulating of the 3D product image and the 3D augmented replica of a body part. Thus, there is described a method of using an image of a face of a person to look for and estimate missing parts of the face, and using these missing parts to interpolate missing parts; the method creates a 3D models of persons over which, for example, spectacles can be tested in a web store, for example Internet web-site.

Aforementioned known approaches to on-line shopping result in a problem of a lack of opportunity to try on clothes, for example to determine whether or not the clothes are of suitable size for the users, and whether or not the clothes are suited in style for characteristics of the users. Such contemporary lack of opportunity to try on clothes prior to making purchases on-line results in many returns, and Internet web stores are thus obliged to be able to handle a large volume of returned clothes. Thus, there contemporarily exists a lack of Internet or similar communication network services which enable users to try out different clothing before making an actual on-line purchase of the clothing.

SUMMARY

In one embodiment, the aspects of the disclosed embodiments generally provide an improved network service, for example an Internet-based service, which enables users to try out different clothing before making an actual on-line purchase of the clothing.

According to a first aspect of the disclosed embodiments, there is provided a method generating image data representative of a person wearing one or more items of clothing, including using computing hardware to process data of one or more images of people wearing items of clothing to extract via segmentation processes data representative of the items of clothing; using computing hardware to process the data representative of the items of clothing to complete one or more missing parts of the data representative of the items of clothing to generate corresponding clothes data; using computing hardware to analyse an image of a target model to determine a pose of the target model in the image; and using computing hardware to metamorphose at least a portion of the clothes data to fit the image of the target model to generate metamorphosed clothes data, and to overlay the metamorphosed clothes data onto the image of the target model.

The method is capable of providing an improved network service for trying out different clothing before purchase.

Optionally, the method includes providing a communication-network-based clothes retailing service which is adapted for use with trying one or more clothes on the target model. More optionally, the method is implemented to enable a user of the service to try the one or more clothes on the target model prior to purchasing one or more of the clothes via the communication-network-based clothes retailing service. Yet more optionally, the method includes implementing a size of the target model to be representative of the user of the service.

Optionally, in one embodiment, the method includes in its step (b) completion of the one or more missing parts by using manual inspection using human effort.

Optionally, in one embodiment, the method includes in its step (b) completion of the one or more missing parts by employing artificial intelligence processes, the processes including at least one of: neural network analysis, image processes based upon extrapolation of image textural information, image analysis based upon a body position from which the data representative of the items of clothing is extracted.

Optionally, in one embodiment, the method includes storing the clothes data generated in step (b) onto a database for subsequent use by one or more users.

Optionally, in one embodiment, step (d) of the method includes employing a drag-and-drop functionality to enable of the metamorphosed clothes onto the target model.

Optionally, in one embodiment, step (d) of the method includes utilizing a least squares fitting approach for obtaining an optimal overlay of the metamorphosed clothes onto the target model.

Optionally, in one embodiment, step (d) of the method includes generating an animated series of images of the target model wearing the metamorphosed clothes in a plurality of target model body postures.

Optionally, in one embodiment, step (d) of the method includes generating a 3-D representation of the target model onto which the metamorphosed clothes are overlaid.

Optionally, in one embodiment, step (d) includes a product ordering and payment service for purchasing one or more clothes represented by the one or more metamorphosed clothes overlaid onto the target model.

According to a second aspect of the disclosed embodiments, there is provided a software product recorded on a machine-readable data storage medium that is is executable upon computing hardware for implementing a method pursuant to the first aspect of the disclosed embodiments.

According to a third aspect of the disclosed embodiments, there is provided a system including computing hardware, a database arrangement and a communication network which are mutually coupled in communication, that is operable to implement a method pursuant to the first aspect of the disclosed embodiments.

It will be appreciated that features of the disclosed embodiments are susceptible to being combined in various combinations without departing from the scope of the invention as defined by the appended claims.

BRIEF DESCRIPTION OF THE DRAWINGS

Aspects of the disclosed embodiments will now be described, by way of example only, with reference to the following diagrams wherein.

DETAILED DESCRIPTION OF THE DISCLOSED EMBODIMENTS

The aspects of the disclosed embodiments concern a web-based service, conveniently referred to as "StyleWhile", that is aimed at providing an environment for creating and sharing one's style using images from various web stores and other sources. Moreover, the service is based, optionally exclusively, on images, thereby avoiding any supplementary information or support from other web-stores or from a user of the service. Such ease of use renders the service potentially attractive to users. Furthermore, the disclosed embodiments concern methods and system which are operable to provide the service.

Figure 1:
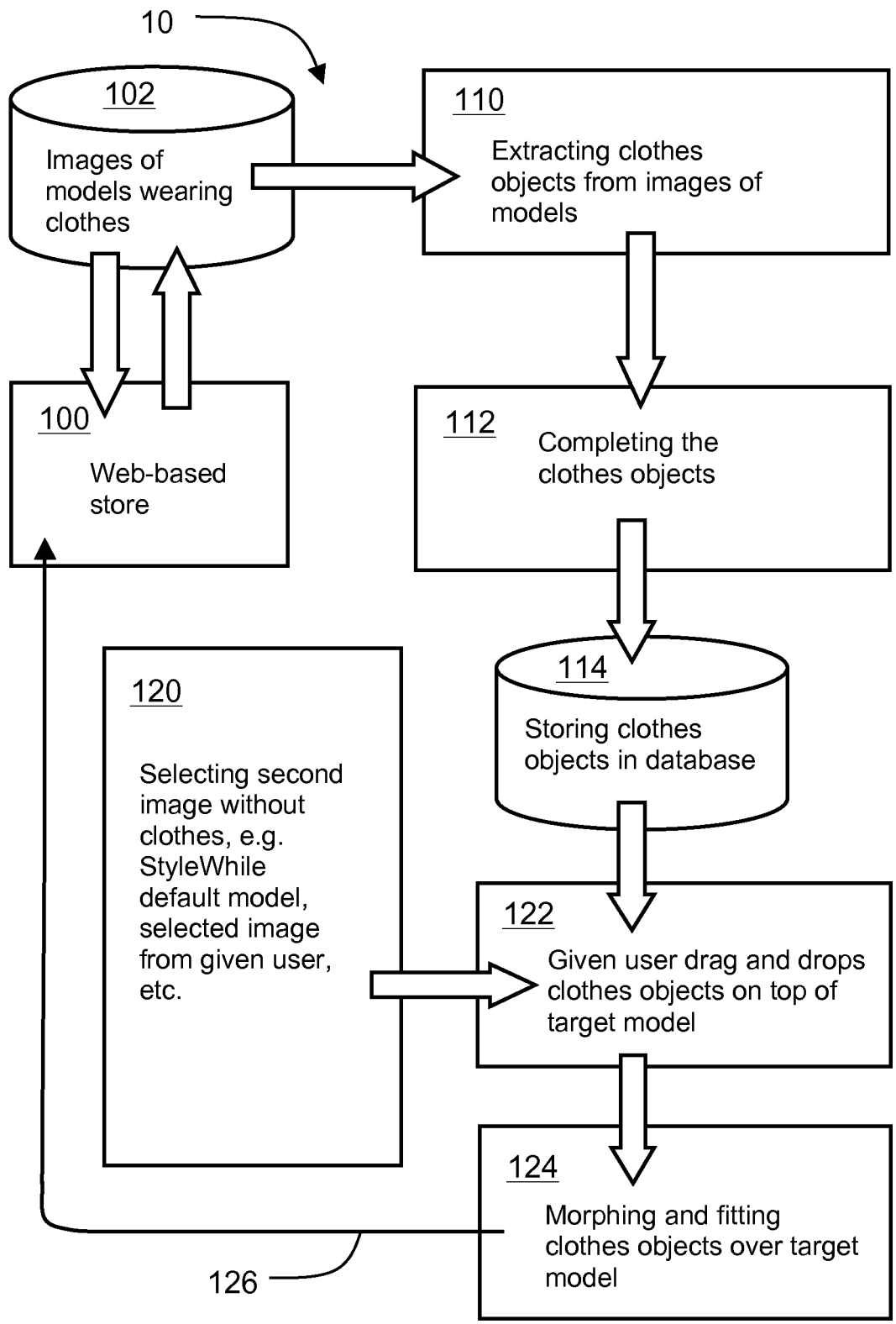
FIG. 1 is an illustration of a StyleWhile service flow chart in accordance with aspects of the disclosed embodiments.

Referring to FIG. 1, there is indicated generally by 10 a StyleWhile service flow chart which forms a basis for a method pursuant to the present embodiment. The service 10 is optionally integrated with one or more web stores 100, for example Internet-based web stores. At least one of the one or more web stores 100 has associated therewith a database 102 which stores images, for example in contemporary .jpg, .gif, .png or similar formats; the images depict models wearing clothes that are sold at the at least one of the one or more web stores 100.

The method implementing the service 10 includes an extraction step 110, wherein a first sub-step involves analysing an image of a person wearing clothes. Such analysis includes segmenting the image to identify clothes and then extracting clothes objects from the image. In addition to receiving images from the database 102, a given user employing the service 10 is able to upload their own images, for example photographs, for clothes object creation purposes. In the aforementioned, image segmentation is a process of extracting parts or segments of interest present in an image which need to be segmented out from the image. The extraction step 102 beneficially employs a plurality of segmentation algorithms for providing identification of clothes, wherein such algorithms beneficially include one or more of:

(a) image analysis based upon neural networks, wherein the neural networks are programmed by presenting the neural networks with images of people wearing clothes and then the corresponding clothes in isolation;

(b) shape periphery analysis based upon spatial abrupt colour and/or brightness transitions present in the image;

(c) template matching which is achieved by performing spatial correlation between a template reference for a given type of clothing against the image, subject to image scaling and/or rotation to obtain a best correlation;

(d) graph-cut-based image segmentation methods, for example as described in documents [1] and [2] herewith appended and incorporated by reference.

Document [1] pertains to Carreira, J., & Sminchisescu, C. (2011), *"Constrained Parametric Min-Cuts for Automatic Object Segmentation"*, IEEE transactions on pattern analysis and machine intelligence, (November), 1-15, doi:10.1109/TPAMI.2011.231.

Document [2] pertains to Rother, C., & Kolmogorov, V. (2004), *"Grabcut: Interactive foreground extraction using iterated graph cuts"*, ACM Transactions and Graphics.

Figure 2:
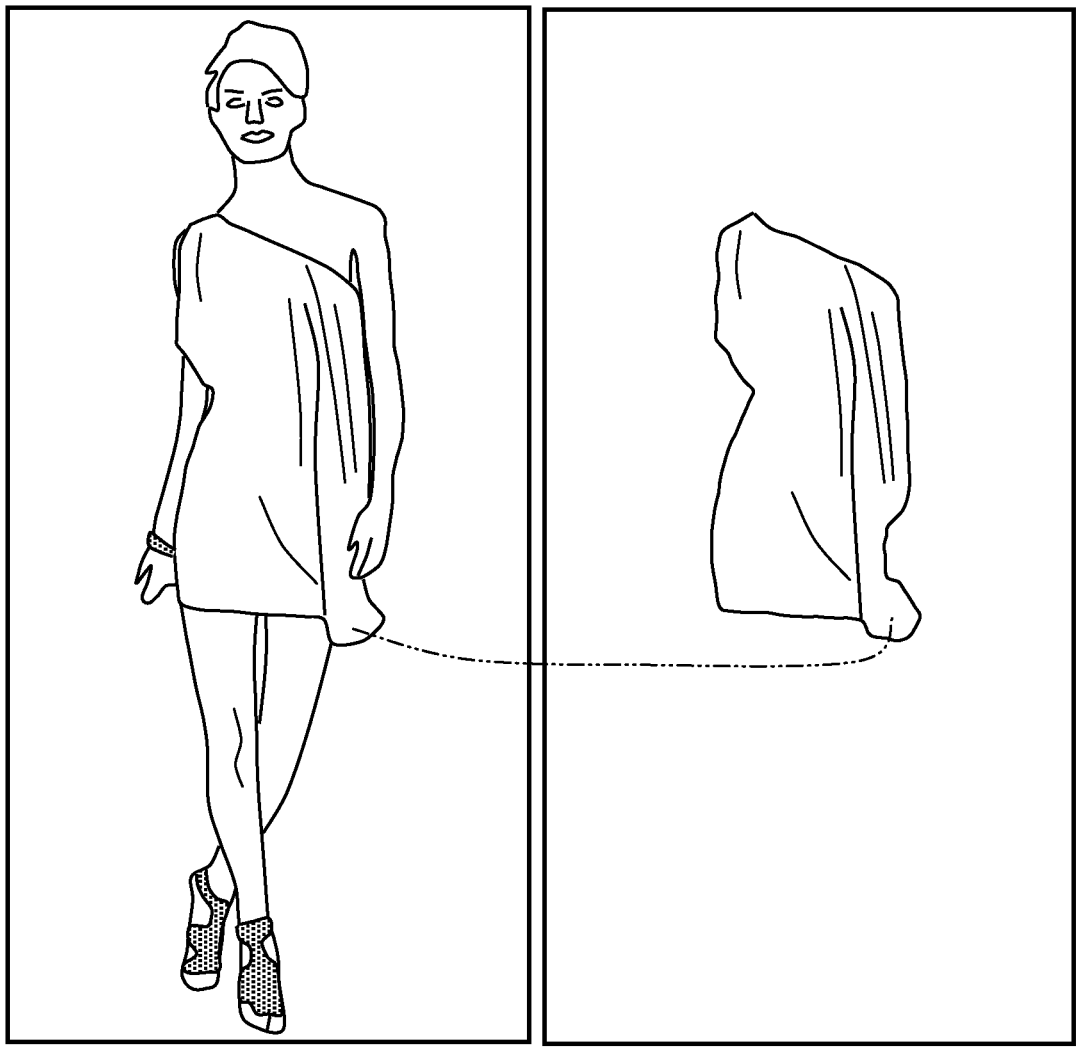
FIG. 2 is an illustration of an image segmentation operation applied to an image of a person for extracting therefrom a sub-image of an item of clothing worn by the person.

In FIG. 2, an example of segmentation results is illustrated wherein an image of a given person wearing an item of clothing is analyzed to extract a sub-image of the item of clothing. Optionally, based upon a developed algorithm, in one part of the extraction of the sub-image, the image is masked using an appropriate Chroma filter for performing the following:

(a) identifying a face of the person from the image using face recognitions; and (b) using mean colour values of the face to create a mask for use in identifying the item of clothing.

Figure 3:
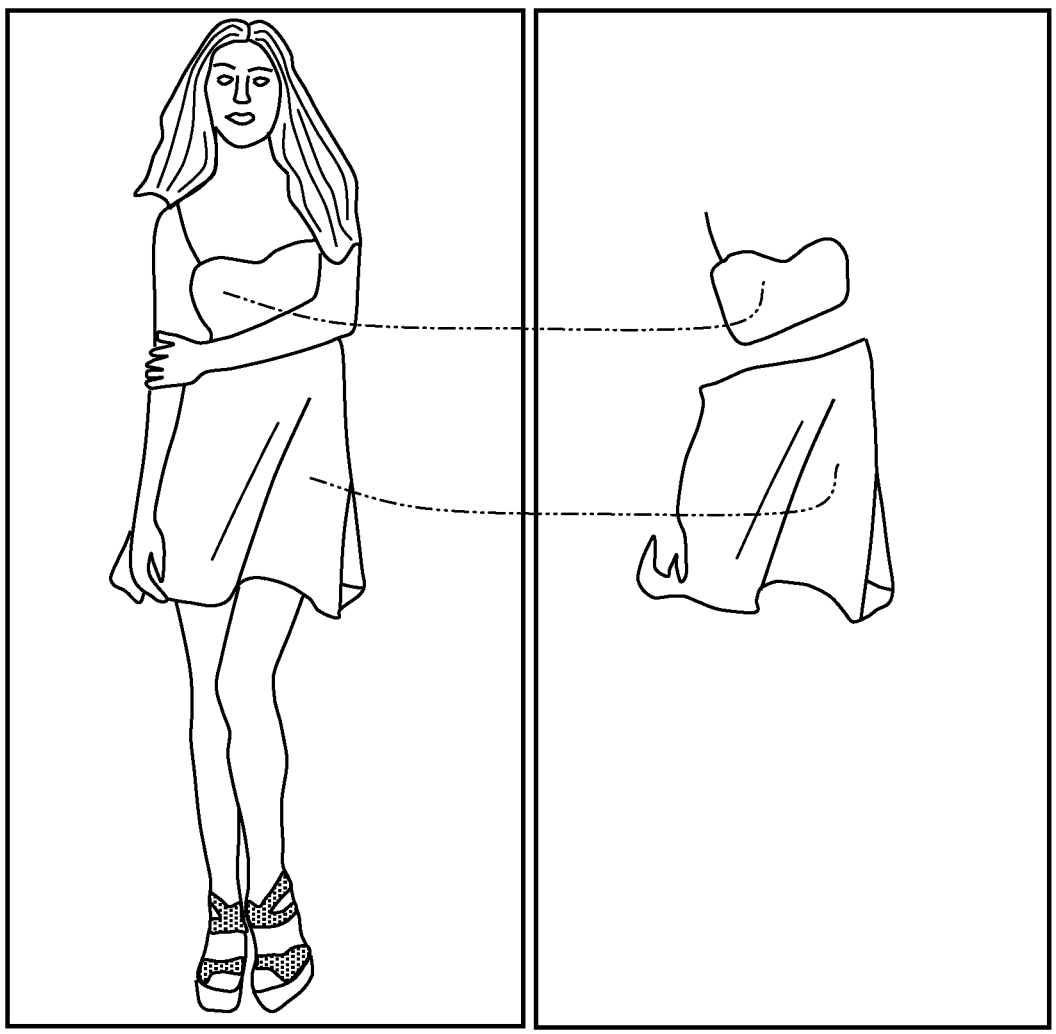
FIG. 3 is an illustration of segmenting an image of a model wearing a dress, wherein the dress is extracted as a sub-image for storing in a clothes object database.

In a completion step 112 in FIG. 1, when the items of clothing are segmented from images as sub-images, it is found in practice that there are often omissions in regions of the sub-images for various reasons, for example occlusion of person body limbs being a frequent cause of omission. In FIG. 3, an example of omission is provided wherein a left arm of the person occludes a transverse portion of a dress, and wherein a right arm of the person occludes a lower portion of the dress. The completion step 112 includes various methods of completing missing portions of sub-images. For example, the step 112 beneficially employs fragment-based image completion, for example as described in Drori, I., & Cohen-Or, D. (2003), *"Fragment-based image completion"*, AGM Transactions on Graphics, pp. 303-312, this document hereby being incorporated by reference. Alternatively, or additionally, the step 112 employs structure propagation methods as described in Sun, J., Yuan, L., & Jia, J. (2005), *"Image completion with structure propagation"*, ACM Transactions on Graphics (ToG), this document hereby being incorporated by reference. Yet alternatively, or additionally, the step 112 employs interactive methods, for example as described in Pavi, D., Schnefeld, V., & Kobbelt, L. (2006), *"Interactive image completion with perspective correction"*, The Visual Computer, 22(9-11), pp. 671-681, doi:10.1007/s00371-006-0050-2, this document hereby being incorporated by reference.

In a database storage step 114, the clothes objects, namely sub-images, are stored in a database as images of clothes. Beneficially, the clothes objects are associated with at least one web-based store, for example associated with purchase information such as price, availability, delivery time, available sizes, available colours and so forth.

Figure 4:
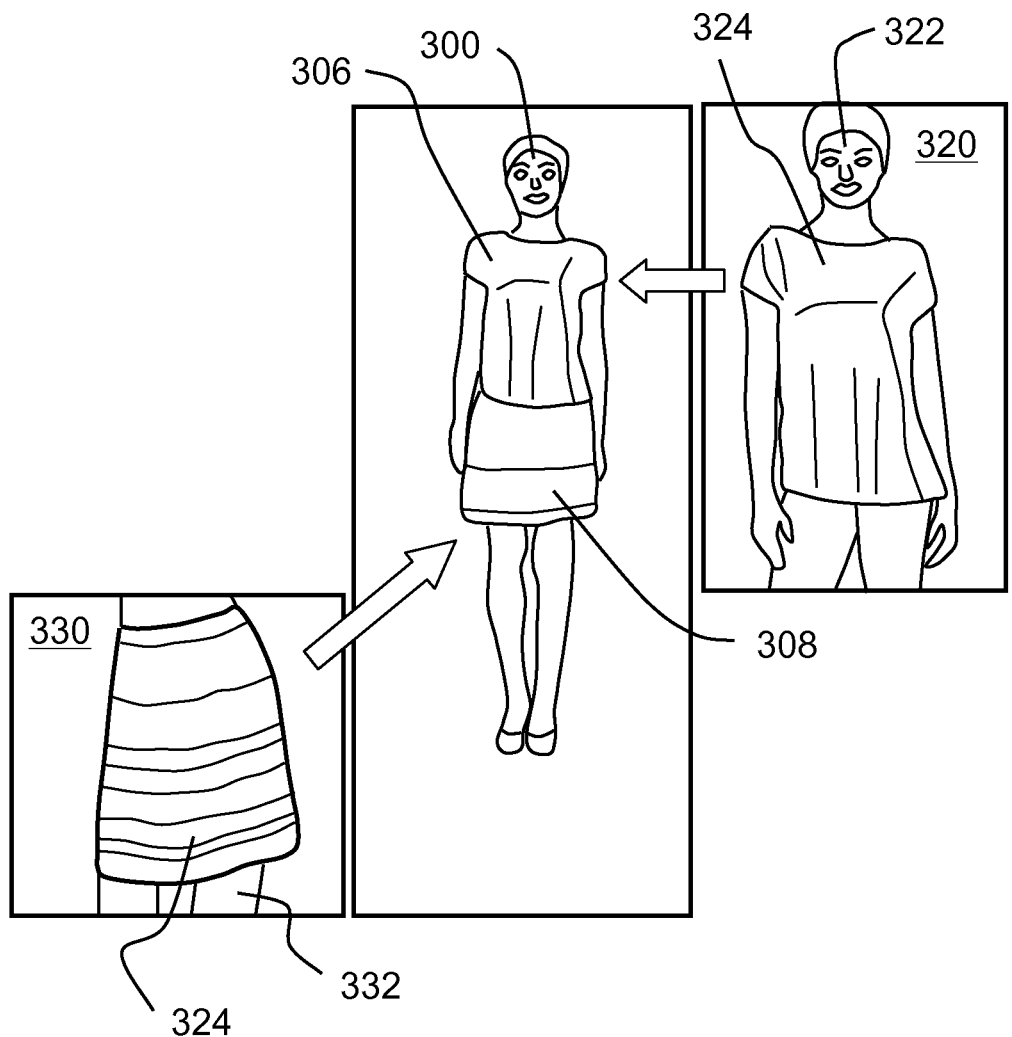
FIG. 4 is an illustration extracting clothes sub-images and overlaying them onto a target model according to the service of FIG. 1. In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

In usability-related steps 120, 122, the service 10 can optionally be configured to present via a user interface of the service 10, for example via a web browser, an image of a target or default model 300 to the given user, as illustrated in FIG. 4; the default model appears substantially devoid of clothing or with underwear thereupon, ensuring of course that prudent decency is always upheld. Alternatively, the model 300 can be selected by the given user, for example from a list of default models, or the model 300 can be derived from an image uploaded by the given user to the service 10. Thus, beneficially, the target model 300 is selected by the given user in the step 120. In the step 122, the given user is capable of using the service 10 to drag and drop clothes from the image database 114 onto a second model.

In a morphing and image fitting step 124 of the service 10, there is performed pose estimation. Thus, in the step 124, images are morphed and overlaid, namely fitted onto, the target model 300. In other words, once the clothing items are extracting from the image as aforementioned, the clothing items to be "worn" by the target model 300. It is usual that posture of the person initially wearing an item of clothing prior to aforesaid segmentation is mutually different to the target model 300. There therefore arises a need in the image fitting step 124 to transform the segmented clothing image to make it fit the target model 300; such transformation is beneficially achieved using sub-image spatial stretching processes and/or 3D modeling processes for performing a rotation correction in 3D. Thus, in addition to basic transformations such as scaling and translation, the sub-images of items of clothing need to be morphed in order to fit the target model 300 in a pleasing manner to the given user.

Image morphing employed in the step 124 is optionally based on morphing algorithms as described in Schaefer, S., Mcphail, T., & Warren, J. (2003), *"Image deformation using moving least squares"*, Image (Rochester, N. Y.), this document hereby being incorporated by reference. Thus, a morphing algorithm using moving least squares for morphing, namely transforming, the sub-images of items of clothing is beneficially employed in the step 124 of the service 10.

Algorithms employed in the step 124 are employed to estimate a stance, namely a posture, of the target model 300, so that it is feasible to morph one or more sub-images of items clothing to fit the stance, namely the posture, of the target model 300. The step 124 beneficially employs one or more techniques for 2-dimensional (2D) and 3-dimensional (3D) pose estimation, for example as described in the one or more of the following documents which are hereby incorporated by reference:

(a) Bray, M., Kohli, P., & Torr, P. (2206), *"Posecut: Simultaneous segmentation and 3D pose estimation of humans using dynamic graph-cuts"*, Computer Vision ECCV 2006, 01, 6426555, Springer; and
(b) Straka, M., Hauswiesner, S., Rther, M., & Bischof, H. (2009), *"Skeletal Graph Based Human Pose Estimation in Real-Time"*, Science, 184(1), 169175.

Other techniques of stance estimation for the target model are optionally employed, for example neural-network-based analysis.

In a step 126 of the service 10, the given user is able to add selected clothes to a web-based representation of a shopping cart of the web store 100 for purchase purposes. The given user, for example, is able via the service 10 to input credit card details, delivery address and contact details for arranging for one or more items of clothing corresponding to one or more sub-images manipulated by the given user to be physically delivered to the given user, for example via a commercial courier service.

An example implementation of the service 10 is provided in FIG. 4. A user interface area of the service 10, for example via a web browser, includes the target model 300 over which clothes can be fitted. There are included pictures or images 320, 330 around the target model 300. Optionally, the images 320, 330 are uploaded from the web store 100; the images 320, 330 include corresponding models 322, 332 respectfully. Moreover, the models 322, 332 are wearing items of clothing 324, 334 respectively. Using user-controllable features of the service 10 as aforementioned, the given user can drag and drop any of the items of clothing 324, 334 onto the target model 300. For example, when the given user selects the item of clothing 324, namely a white T-shirt, it can be dragged and dropped onto the model 300 as illustrated. The T-shirt item of clothing 324 is extracted from the image 320 using the aforementioned steps 110, 112; beneficially, the extraction is implemented either in real-time when the given user selects the image 320 or beforehand by way of pre-processing. When the given user drags one or more sub-images of one or more items of clothing, for example the aforementioned T-shirt, over the target model 300, the T-shirt is morphed, namely transformed, and fitted, optionally employing aforementioned pose estimation, over the model 300, namely in association with the step 124. The morphed and fitted T-shirt 306 is illustrated in FIG. 4 fitted to the target model 300.

In a similar manner, the given user is able, using the service 10, to investigate how the skirt 334 worn by the model 332 in the image 330 appears when dragged and fitted onto the target model 300. An illustration of the morphed and fitted skirt upon the target model is provided in FIG. 4. Optionally, the service 10 is implemented such that every time the given user drags an item of clothing onto the target model 300, a shopping cart of the service is automatically updated with a record of the item of clothing; the given user is then optionally able to delete one or more items of clothing from the shopping cart prior to authorizing a purchase of the items of clothing via the service 10 as aforementioned. As aforementioned, the target model 300 can be a model defined by a provider of the service 10; alternatively, the target model 300 can be an image uploaded by the given user, for example a representation of the given user.

Modifications to embodiments of the aspects of the disclosed embodiments that have been described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A method of generating image data representative of a person wearing one or more items of clothing, comprising:
   using computing hardware to process data of one or more images of people wearing items of clothing for sale;
   segmenting the one or more images to identify the items clothing for sale;
   extracting via a segmentation process, data representative of the items of clothing for sale from the one or more images of people wearing the items of clothing for sale;
   identify, in the extracted data, one or more missing portions of the items of clothing for sale;
   using computing hardware to process the extracted data representative of the items of clothing for sale to complete the one or more missing portions of the items of clothing for sale from the extracted data representative of the items of clothing for sale to generate corresponding clothes data;
   using computing hardware to:
      analyse an image of a target model;
      determine a pose of the target model in the image; and metamorphose the clothes data to fit the pose of the target model in the image, and overlay the metamorphosed clothes data onto the pose of the target model in the image;

detect a selection of one or more other items of clothing for sale from the one or more images of people wearing the items of clothing for sale; and drag and drop the selected one or more other items onto the target model in the image, wherein the selected one or more other items are metamorphosed onto the pose of target model together with the overlayed metamorphosed clothes data on the target model.

2. The method as claimed in claim 1, further comprising providing a communication-network-based clothes retailing service which is adapted for use with trying the one or more items of clothing on the target model.

3. The method as claimed in claim 2, wherein the method is implemented to enable a user of the service to try the one or items of clothing on the target model prior to purchasing one or more of the clothes via the communication-network-based clothes retailing service.

4. The method as claimed in claim 3, further comprising implementing a size of the target model to be representative of the user of the service.

5. The method as claimed in claim 1, further comprising completion of the one or more missing parts by using manual inspection using human effort.

6. The method as claimed in claim 1, further comprising completion of the one or more missing parts by employing artificial intelligence processes, said processes including at least one of: neural network analysis, image processes based upon extrapolation of image textural information, image analysis based upon a body position from which the data representative of the items of clothing is extracted.

7. The method as claimed in claim 1, further comprising storing the generated clothes data generated onto a database for subsequent use by one or more users.

8. The method as claimed in claim 1, further comprising utilizing a least squares fitting approach for obtaining an optimal overlay of the metamorphosed clothes onto the target model.

9. The method as claimed in claim 1, further comprising generating an animated series of images of the target model wearing the metamorphosed clothes in a plurality of target model body postures.

10. The method as claimed in claim 1, further comprising generating a 3-D representation of the target model onto which the metamorphosed clothes are overlaid.

11. The method as claimed in claim 1, further comprising a product ordering and payment service for purchasing one or more clothes represented by the one or more metamorphosed clothes overlaid onto the target model.

12. A software product recorded on a non-transitory machine-readable data storage medium, the software product being executable upon computing hardware for implementing the method as claimed in claim 1.

13. A system including computing hardware, a database arrangement and a communication network which are mutually coupled in communication, is the system being operable to implement the method as claimed in claim 1.

14. A system comprising:
a computing hardware;
a database; and
a communication network, the computing hardware including a software product recorded on a non-transitory computer readable medium, the software product, when executed on the computing hardware, being configured to:

analyze an image of a person wearing at least one item of clothing for sale;

segment the image to identify the at least one item of clothing for sale in the analyzed image;

extract a clothes object from the segmented image corresponding to the identified item of clothing for sale;

identify, in the extracted clothes object, one or more missing portions of the identified item of clothing for sale;

process the one or more missing portions to complete the one or more missing portions;

determine a pose of a target model in an image that is different from a pose of the image of the person wearing the at least one item of clothing for sale; and transform the extracted clothes object to fit the pose of the target model in the image.

15. The system of claim 14, wherein, the software product, when executed on the computing hardware, is configured to complete the one or more missing portions by:

detecting an omission between regions of the segmented image; and inserting an image object into the omission to complete the segmented image.

16. The system of claim 14, wherein the software product, when executed on the computing hardware, is configured to:
mask the segmented image with a Chroma filter;
identify a face region of the person from the image using face recognition; and
use mean colour values of the face region to create a mask to identify the clothing item.

17. The system of claim 14, wherein the image comprises a photograph.

18. The system of claim 14, wherein a plurality of segmentation algorithms are used to segment the image and identify the item of clothing.

19. The system of claim 15, the software product, when executed on the computing hardware, is configured to segment the item of clothing as a sub-image, identify a region of the sub-image as a region of omission and insert the image object into the region of omission to complete the one or more missing portions.

20. The system of claim 14, wherein the software product, when executed on the computing hardware, is further configured to:

detect a selection of one or more other items of clothing for sale from one or more other analyzed images of people wearing at least one other item of clothing for sale; and drag and drop the selected one or more other items onto the target model in the image, wherein the selected one or more other items are metamorphosed to fit onto the pose of target model together with the extracted clothes object.

* * * * *